US 8,144,718 B2

(12) United States Patent
Schwenkel et al.

(10) Patent No.: US 8,144,718 B2
(45) Date of Patent: Mar. 27, 2012

(54) CONTROL SYSTEM HAVING A PLURALITY OF SPATIALLY DISTRIBUTED STATIONS, AND METHOD FOR TRANSMITTING DATA IN SUCH A CONTROL SYSTEM

(75) Inventors: Hans Schwenkel, Stuttgart (DE); Klaus Wohnhaas, Fellbach (DE); Reinhard Sperrer, Ostfildern (DE); Matthias Holzaepfel, Stuttgart (DE); Roland Rupp, Hattenhofen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 183 days.

(21) Appl. No.: 11/767,165

(22) Filed: Jun. 22, 2007

(65) Prior Publication Data

US 2008/0002737 A1   Jan. 3, 2008

Related U.S. Application Data

(63) Continuation of application No. PCT/EP2005/013764, filed on Dec. 21, 2005.

(30) Foreign Application Priority Data

Dec. 24, 2004  (DE) .......................... 10 2004 063 213
Dec. 27, 2004  (DE) .......................... 10 2004 063 584

(51) Int. Cl.
*H04L 12/44* (2006.01)
(52) U.S. Cl. .......................... 370/408; 370/451; 370/471
(58) Field of Classification Search .................. 370/471, 370/403
See application file for complete search history.

(56) References Cited

U.S. PATENT DOCUMENTS

| 4,517,644 | A | | 5/1985 | Hamada et al. |
| 5,774,469 | A | * | 6/1998 | Wirkestrand .................. 370/473 |
| 5,781,534 | A | * | 7/1998 | Perlman et al. ............... 370/248 |
| 6,047,328 | A | * | 4/2000 | Charny et al. ................. 709/233 |
| 6,141,336 | A | * | 10/2000 | Bauchot et al. ............... 370/348 |
| 6,202,082 | B1 | * | 3/2001 | Tomizawa et al. ............ 709/201 |
| 6,704,899 | B1 | * | 3/2004 | Dold et al. .................... 714/752 |

(Continued)

FOREIGN PATENT DOCUMENTS

DE   198 51 245 A1   12/1999

(Continued)

OTHER PUBLICATIONS

Jansen, D and Buttner, H. "Real-time Ethernet the EtherCAT solution". Computing & Control Engineering Journal, vol. 15, Issue 1, pp. 16-21 (Feb./Mar. 2004).*

(Continued)

*Primary Examiner* — Huy Vu
*Assistant Examiner* — Benjamin Lamont
(74) *Attorney, Agent, or Firm* — Harness, Dickey & Pierce, P.L.C.

(57) ABSTRACT

In a method for transmitting data in a control system, a first station generates a data frame having a plurality of data fields. At least one data field to be filled with transmission data is clearly assigned to each further station. The data frame is transmitted as an outgoing data frame from one station to the next, with every further station filling the respectively assigned data field with transmission data. The last station returns the data frame as a returning data frame to the series of stations. The stations read extraneous transmission data from the data fields in the returning data frame. Preferably, the respective data fields are individually assigned to the stations.

21 Claims, 6 Drawing Sheets

U.S. PATENT DOCUMENTS

| | | | |
|---|---|---|---|
| 6,891,849 | B1 | 5/2005 | Jasperneite et al. |
| 6,944,165 | B2 | 9/2005 | Fujiyama et al. |
| 7,302,494 | B2 | 11/2007 | Hayashi et al. |
| 2002/0083174 | A1* | 6/2002 | Hayashi et al. ............... 709/225 |
| 2002/0138668 | A1 | 9/2002 | Heckel |
| 2004/0267503 | A1* | 12/2004 | Batterberry et al. ........... 702/188 |
| 2005/0114577 | A1 | 5/2005 | Beckhoff et al. |
| 2007/0043877 | A1* | 2/2007 | Seiler ............................ 709/246 |

FOREIGN PATENT DOCUMENTS

| | | |
|---|---|---|
| DE | 199 34 514 C1 | 2/2001 |
| DE | 298 24 978 U1 | 3/2004 |
| EP | 1 075 110 A2 | 2/2001 |
| JP | 57-45757 | 3/1982 |
| JP | 8-70312 | 3/1996 |
| JP | 10-135996 | 5/1998 |
| JP | 11-136243 | 5/1999 |
| JP | 2002-171268 | 6/2002 |
| JP | 2002-330146 | 11/2002 |
| JP | 2003-143069 | 5/2003 |
| WO | WO 03/054644 A2 | 12/2002 |
| WO | WO 03/061211 A1 | 7/2003 |
| WO | 2004/071025 A1 | 2/2004 |

OTHER PUBLICATIONS

EtherCAT—the Ethernet Fieldbus, http://www.ethercat.org/pdf/ethercat_e.pdf, a publication by ethercat.org, Nov. 26, 2003.*

Christian Schwab, Automation Protocols—An Update, Apr. 2004, pp. 6-9.

EtherCAT—Der Ethernet-Feldbus; 10 pages, Nov. 2003.

Computer & Automation; Ethernet bis in die Klemme; May 2003; 5 pages.

* cited by examiner

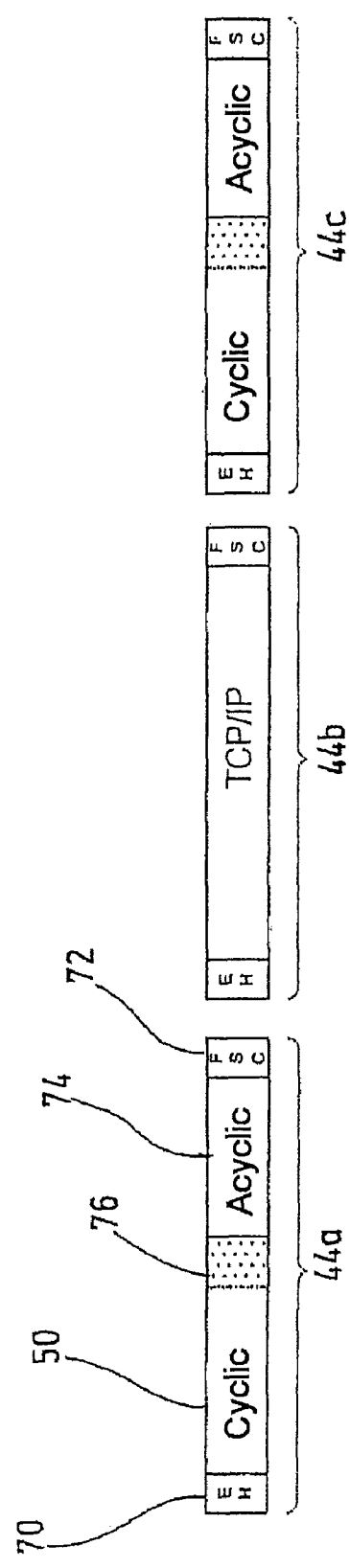
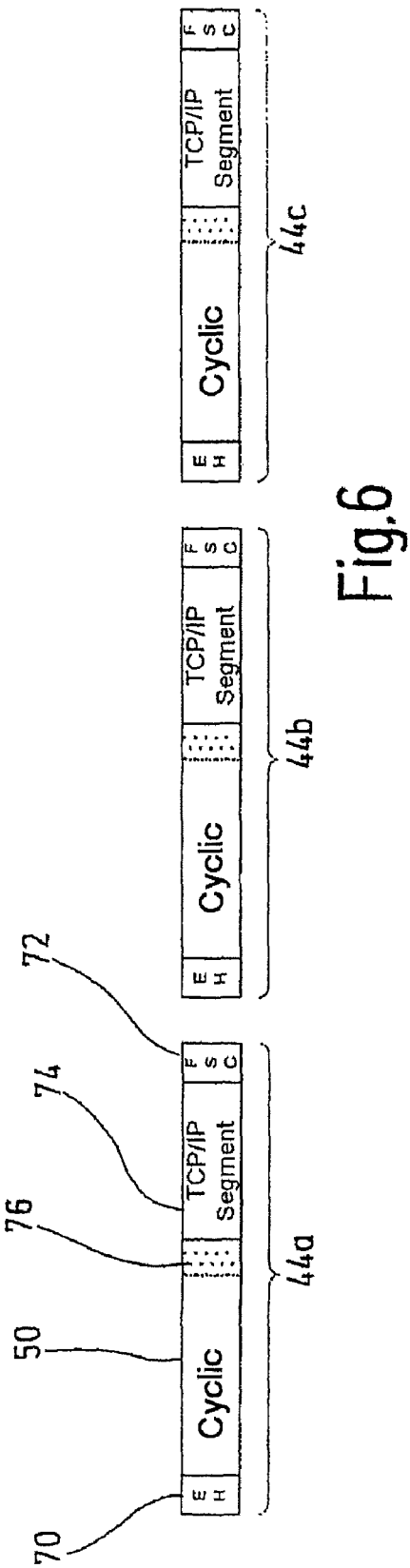

CONTROL SYSTEM HAVING A PLURALITY OF SPATIALLY DISTRIBUTED STATIONS, AND METHOD FOR TRANSMITTING DATA IN SUCH A CONTROL SYSTEM

CROSS REFERENCES TO RELATED APPLICATIONS

This application is a continuation of international patent application PCT/EP2005/013764, filed on Dec. 21, 2005 designating the U.S., which international patent application has been published in German language as WO 2006/069691 A1 and claims priority from German patent applications DE 10 2004 063 213.8, filed on Dec. 24, 2004, and DE 10 2004 063 584.6 filed on Dec. 27, 2004. The entire contents of these applications are incorporated herein by reference.

BACKGROUND OF THE INVENTION

The present invention relates to a method for transmitting data in a control system having a plurality of spatially distributed stations which are connected to one another via a communication medium, and to a control system using the method. More particularly, the invention relates to a method and a control system for the automated control of installations or appliances, such as machining, manufacturing and/or conveyor installations.

German patent DE 199 34 514 C1 discloses a method for configuring a station (called a bus subscriber in that document) which is connected to a field bus. In particular, the document relates to the failsafe assignment of a logical address to a station which is connected to other bus subscribers/stations via a communication bus system which known as the Interbus. The Interbus is a specified field bus system used particularly in industrial automation of installations and appliances. Other known field bus systems are known as the CAN bus, the Profibus, or DeviceNet.

The known field bus systems are used to connect a plurality of spatially distributed stations/bus subscribers to one another such that they can interchange information. In this context, field bus systems are tailored particularly to the communication demands which arise from the intended use as a communication medium in control systems for the automated control of installations and appliances. Besides the simplest and most robust wiring possible, these particularly include a determinate timing response for the transmission of the data and also the ability to transport relatively small volumes of data from a large number of stations. Typically, a field bus has one or a few (intelligent) control unit(s) connected to it and also a large number of remote I/O units which pick up state signals from the installation or from the appliance via sensors and report them to the control unit(s) and/or receive control data from the superordinate control unit and operate suitable actuators on the basis thereof. By way of example, an I/O unit can pick up the signals from position switches, light barriers, rotary position transducers, inter alia, and can transmit them via the field bus to the superordinate control unit. The control unit, frequently a programmable logic controller (PLC), takes these process variables as a basis for determining control data for actuators, such as solenoid valves, contactors, drives, inter alia. The I/O units receive the control data from the superordinate controller via the field bus and operate the actuators.

The Interbus cited at the outset operates in the manner of a large shift register whose individual storage locations are in the connected stations. What is known as a bus master, which is frequently physically arranged in the superordinate control unit, generates a data frame having a number of data fields which corresponds to the number of storage locations in the "shift register". This data frame is sent from the bus master to the stations connected in series and in so doing is forwarded data field by data field from one station to the next. The last station in the series returns the data frame to the bus master, so that a ring structure is ultimately obtained. When a start word generated by the bus master arrives on the bus master again after passing through the ring structure and no transmission errors are identified in a subsequent checksum evaluation, the bus master uses a control signal to signal all the connected stations that they need to accept the data which are then in their respective shift registers for further processing. In addition, the individual stations "empty" their internal shift registers filled with transmission data by transmitting the data stored therein to the next station in the ring when the bus master initiates a new data circulation. One characteristic of the Interbus is therefore that the number of data fields in the circulating data frame is equal to the number of storage locations in the connected stations. In addition, communication actually takes place only between each individual station and the bus master. Interconnecting traffic between two stations which do not have bus master functionality is possible only from one transmission cycle to the next by virtue of the sending station first of all transmitting its data to the bus master and the bus master forwarding the data to the receiving station in a second data cycle. An advantage of the Interbus concept is the deterministic timing response, i.e. the time required for transmitting a piece of information can be predicted with a high degree of certainty. In addition, no collisions can occur between competing messages.

In contrast to this, collisions are basically possible in the case of what are known as message-oriented field bus systems, such as the CAN bus, since the individual stations can generate and send data messages independently. In the case of the CAN bus, such collisions are resolved by virtue of the stations having different priorities, where a station having a higher priority asserts its authority in the event of a collision. For the station having a lower priority, however, this means that it is at least temporarily prevented from sending a message. To implement a deterministic timing response, it is therefore necessary to limit the maximum utilization level of the field bus, since the probability of collisions rises as the utilization level of the bus increases. On the other hand, CAN bus-based control systems provide a higher level of flexibility, since interconnecting traffic is possible, in principle, without the interposition of a bus master. This particularly means that safety-related data, such as an emergency off command, can be transmitted more quickly, even as a broadcast telegram if appropriate.

Outside of the specific field bus technology, communication networks based on what is known as the Ethernet standard have become widely used as a result of the Internet and the networking of personal computers. In Ethernet networks, each subscriber (each station) has an individual address, what is known as the MAC address. In principle, any station can send a message at any time. Each sending station monitors the connecting line to determine whether the message sent can also be read in uncorrupted form, which would not be the case if there were a collision with a simultaneously sending station. In the event of a collision, each station sends its transmission data again after a randomly selected time period has elapsed. Due to the widespread use, Ethernet networks have the advantage that the relevant hardware components are very inexpensive. However, they do not have a deterministic timing response and, moreover, are more optimized for acyclic transmission of relatively large volumes of data by few connected stations. By contrast, control systems primarily require cyclic data transmission. However, the inexpensive hardware components mean that for some years there have been efforts to use Ethernet technologies for the communication between the stations in a control system for controlling a technical installation or a technical appliance too. Principles and providers of corresponding components are described by way of example in the German publication "Industrial Ethernet", which is available under ISBN 3-8259-1925-0 from Vogel-Industrie Medien GmbH und Co. KG in 97064 Würzburg.

The previously proposed approaches to using Ethernet components in automated control systems are not optimum, however. Difficulties arise particularly for the transmission of safety-related control data, such as the transmission of an emergency off signal or the transmission of a shut down command which is subsequently generated by the control unit for a drive. Data transmission with short cycle times, which is needed for drive control, for example, is also difficult to implement on the basis of Ethernet components.

SUMMARY OF THE INVENTION

Against this background, it is an object of the invention to provide a method which allows data to be transmitted in a control system for the automated control of an installation or an appliance under high real-time demands.

It is also an object to provide a control system in which control and process data can be transmitted using commercial components, particularly Ethernet components.

It is another object to provide a new method and control system allowing to communicate safety-related control and process data between remote stations in a fail-safe and cost effective manner.

In accordance with one aspect of the invention, there is provided a method for transmitting data in a control system comprising a plurality of spatially distributed stations which are connected to one another via a communication medium, the stations being logically arranged in a series which defines a first station, at least one second station and a last station, the method comprising the following steps: the first station generates a data frame having a plurality of data fields, with every second station and the last station being clearly assigned at least one data field for filling with transmission data, the first station sends the data frame as an outgoing data frame to that second station which comes after the first station in the series, the second stations receive the outgoing data frame from the respective previous station in the series, fill a data field assigned to it with transmission data and send the outgoing data frame with the transmission data to the next station in the series, and the last station receives the outgoing data frame from the previous station in the series, fills a data field assigned to it with last transmission data and returns the data frame with all the transmission data as a returning data frame to the series of stations, wherein the stations read extraneous transmission data from the data fields in the returning data frame.

In accordance with another aspect, there is provided a control system for the automated control of installations or appliances, comprising a plurality of spatially distributed stations connected to one another via a communication medium, where the stations are logically arranged in a series which defines a first station, at least one second station and a last station, wherein the first station is designed to generate a data frame having a plurality of data fields, with every second station and the last station being clearly assigned at least one data field for filling with transmission data, wherein the first station is further designed to send the data frame as an outgoing data frame to that second station which comes after the first station in the series, wherein every second station is designed to receive the outgoing data frame from the respective previous station in the series, to fill a data field assigned to it with transmission data, and to send the outgoing data frame with the transmission data to the next station in the series, and wherein the last station is designed to receive the outgoing data frame from the previous station in the series, to fill a data field assigned to it with last transmission data, and to return the data frame with all the transmission data as a returning data frame to the series of stations, wherein the stations are designed to read extraneous transmission data from the data fields in the returning data frame.

It is particularly preferred, if the stations comprise at least one control unit which is designed to cyclically process process data and to generate control data on the basis thereof, and also comprise a plurality of I/O units which are designed to send process data to the control unit and to receive control data from the control unit. In principle, the new method can also be used for other control systems and/or communication networks, however.

In accordance with another aspect, there is provided a communication module for use in a station of a control system comprising a plurality of spatially distributed stations connected to one another via a communication medium, where the stations are logically arranged in a series which defines a first station, at least one second station and a last station, with the first station being designed to generate a data frame having a plurality of data fields, with every second station and the last station being clearly assigned at least one data field for filling with transmission data, with the first station being further designed to send the data frame as an outgoing data frame to that second station which comes after the first station in the series, with every second station being designed to receive the outgoing data frame from the respective previous station in the series, to fill a data field assigned to it with transmission data, and to send the outgoing data frame with the transmission data to the next station in the series, and with the last station being designed to receive the outgoing data frame from the previous station in the series, to fill a data field assigned to it with last transmission data, and to return the data frame with all the transmission data as a returning data frame to the series of stations, wherein the communication module is designed to receive the outgoing data frame and to fill it with the transmission data, to read the transmission data from the returning data frame, and to forward the returning data frame.

In accordance with yet another aspect, there is provided a communication module for use in a station of a control system comprising a plurality of spatially distributed stations connected to one another via a communication medium, where the stations are logically arranged in a series which defines a first station, at least one second station and a last station, with the first station being designed to generate a data frame having a plurality of data fields, with every second station and the last station being clearly assigned at least one data field for filling with transmission data, with the first station being further designed to send the data frame as an outgoing data frame to that second station which comes after the first station in the series, with every second station being designed to receive the outgoing data frame from the respective previous station in the series, to fill a data field assigned to it with transmission data, and to send the outgoing data frame with the transmission data to the next station in the series, and with the last station being designed to receive the outgoing data frame from the previous station in the series, to fill a data field assigned to it with last transmission data, and to return the data frame with all the transmission data as a returning data frame to the series of stations, wherein the communication module is designed to generate the outgoing data frame and to send it to the next station in the series, and to monitor the return of the returning data frame.

The new method and system and the new modules are therefore based on a concept as is known, in principle, from the Interbus, namely the production and transmission of a data frame having a plurality of data fields, the data frame being forwarded in a series of stations from one station to the next. However, the invention differs from the known Interbus because the individual stations read extraneous transmission data directly from the returning data frame, whereas data are typically read only from the outgoing data frame in the case of the Interbus. Preferably, the individual stations read extraneous transmission data exclusively from the returning data frame, and they place their own transmission data exclusively into the data fields in the outgoing data frame. As a departure from this, a more general refinement also allows exceptions to this general principle to be admitted, however.

In the practical implementation, the new method and system are fundamentally different from the Interbus, which according to specification is in the form of a large "shift register". In contrast to this, the new method and system are independent of the physical implementation of the communication medium. In one particularly preferred refinement, which will be discussed further below, the communication medium is an Ethernet-compatible transmission link and the data frame is an Ethernet-compatible data frame, i.e. a data frame whose basic structure fits into the Ethernet specifications.

Whereas the known Interbus implements a ring structure for transmitting the data, where the last station returns the data frame directly to the first station in logical terms, the new method and system provide a "double line" in which both the outgoing data frame and the returning data frame pass through all stations in logical terms. Only by this means is it possible for the individual stations to fill their own transmission data into the data fields in the outgoing data frame and to read extraneous transmission data from the returning data frame. Due to this characteristic, every station receives the circulating data frame twice within a transmission cycle. This allows any interconnecting traffic between two or more arbitrary stations to be concluded within one transmission cycle. The present invention therefore allows data communication which satisfies high real-time demands.

The new method and system also allow extremely flexible communication between arbitrary stations. Therefore, they enjoy the advantages of the message-oriented transmission methods, such as those of CAN bus or Ethernet connection.

By means of the circulating data frame and the advantageous opportunity for direct cross-communication, the new method and system allow very rapid and deterministic communication. They are therefore well suited to transmit even safety-related control data in a manner which will be described in more detail below.

In a preferred refinement, the first station generates the outgoing data frame cyclically at predetermined intervals of time and sends it to the next second station.

In a preferred exemplary embodiment, the cycle time, that is to say the time between the transmission of two successive but mutually independent data frames, is adjustable. In one preferred exemplary embodiment, the cycle time can be adjusted between approximately 60 µs and approximately 6 ms in various intermediate steps.

This refinement is particularly well suited to a control system for the automated control of technical installations or appliances, since information is usually generated cyclically in such a control system. Particularly with short cycle times, for example of 62.5 µs, this refinement allows the process and control data required for regulating a drive in a machine to be transmitted using the new method. In other words, the control system in this refinement can be integrated into the control loop of a machine's drive control, which allows particularly inexpensive and flexible automation of an installation or appliance.

In another refinement, the data frame contains at least a first and a second group of data fields, where the data fields in the first group are firmly assigned to the individual stations over all the data frames, and where the data fields in the second group are assigned to the stations upon individual request for a respective data frame.

This refinement increases flexibility in communication and allows the control system to be optimized in terms of data throughput and transmission speed. The first group of data fields can be used for transmitting data without the need to add address information to them. This is because the firm association of the individual data fields firmly prescribes an address structure. On the other hand, the second group of data fields allows additional transmission capacity to be reserved for individual stations upon request. The second group of data fields is particularly advantageous for transmitting acyclic data, such as diagnostic data. In addition, the data fields in the second group can also be used very advantageously to transmit data about the available communication medium which are extraneous to the system, for example printer data which are sent from a PC to a printer connected to the communication network. In one particularly preferred embodiment, the data fields in the second group are allocated using a flag which is reset to the state "data field(s) free" upon every new data frame. A station wishing to fill a data field in the second group then need only check the flag and if appropriate set it to "occupied". The acyclic communication is preferably handled using well known addressing methods, with the addresses then likewise being transmitted in the data fields in the second group.

In another refinement, the returning data frame passes through the series of stations in the opposite order from the outgoing data frame.

Alternatively, it would also be possible, in principle, for the returning data frame to be routed in a different order. In addition, it would, in principle, also be possible to send the returning data frame to a plurality of or all connected stations at the same time, which is readily possible in the case of a radio link as the transmission medium, for example. By contrast, the present refinement has the advantage that the management complexity is simplified in order to ensure error-free communication. In particular, the first station in the preferred refinement can very easily monitor whether the returning data frame has reached all connected stations. This is of great importance, particularly for the transmission of safety-related data, such as emergency off control commands.

In another refinement, the first station monitors whether the returning data frame arrives within a defined time period.

Monitoring the returning data frame in the first station is particularly advantageous for the transmission of safety-related data, since this allows failure of the communication link to be detected very quickly. On the basis of the real-time demands, the first station can then either initiate a repeat frame or start an error handling routine.

In a particularly preferred refinement, the communication medium is an Ethernet-compatible transmission link, and the data frame is an Ethernet-compatible data frame.

This refinement allows commercially available and hence very inexpensive hardware components to be used at least to some extent. In addition, this refinement makes it a very simple matter to use the data transmission link, which is inherently used for control tasks, for other purposes too, for example for transmitting TCP/IP-compatible data packets. Consequently, considerable costs can be saved when networking components in a workshop or the like. One characteristic of this refinement is, inter alia, that every station has its own MAC address, which would, in principle, allow random communication between various stations. In connection with the present invention, however, every station sends at least the outgoing data frame (and preferably also the returning data frame) to just precisely one exactly defined other station, respectively.

In another refinement, every station sends the outgoing data frame to the next station in the series using what is known as the cut-through method.

The cut-through method is specified for Ethernet-compatible transmission links and involves a station actually analyzing and forwarding an incoming data frame already before it has been fully received by the respective station. This refinement reduces the delay time between reception and forwarding of the outgoing data frame. This allows the system's cycle time to be minimized very easily.

In another refinement, every station sends the outgoing data frame to precisely one next station.

As a departure from this, it would, in principle, also be possible to generate branches, particularly when using Ethernet components. However, the preferred refinement prevents the formation of loops. In addition, collisions on the transmission link are ruled out, which allows a deterministic timing response with very short cycle times to be generated.

In another refinement, the first station generates a plurality of data frames and sends them to the next second station in direct succession as outgoing data frames.

In this refinement, which even on its own is an inventive development over known methods for transmitting data in a control system, the first station generates and sends a plurality of data frames within a transmission cycle. In other words, a first outgoing data frame and directly following further data frames (consequent frames) are sent within the cycle time. This refinement is particularly advantageous if the volume of data to be transmitted cyclically is very large and secondly the length of a single data frame must not exceed a particular maximum value. The present refinement is therefore particularly advantageous when a large amount of cyclic data needs to be transmitted but the data frames used must not exceed the lengths of approximately 1500 bytes defined in the Ethernet specification.

In another refinement, individual data fields in a data frame are filled with transmission data alternately by at least two stations.

This refinement, which even on its own is an inventive further development over known methods for transmitting data in a control system, implements a multiplex mode in which individual data fields are filled by different stations from one cycle to the next. In this case, the respective data fields are also clearly assigned to the stations involved, however. The multiplex mode is particularly advantageous when cyclic data with different repetition speeds are present within a control system. In this case, slower stations can share individual data fields in the multiplex mode, so that the total available transmission capacity is utilized to an optimum extent.

In another refinement, individual stations fill at least one data field in the data frame with transmission data which are compatible with a field bus telegram. It is particularly preferred if said transmission data are compatible with telegrams on the CAN-Bus, Profibus and/or DeviceNet.

In this refinement, said field bus telegrams are transmitted in "tunneled" fashion using the new method. This refinement allows existing field bus networks and their components to be integrated very easily. It is particularly preferable for safety-related process and control data to be transmitted in tunneled fashion in this manner, since in this case it is possible to use tried-and-tested and certified or admitted components for safety-oriented automation.

In another refinement, the stations are individually assigned the data fields in the outgoing data frame for filling with their own transmission data and the data fields in the returning data frame for reading extraneous transmission data.

This refinement allows very flexible and rapid transmission of information between arbitrary stations on the communication medium. In particular, this refinement makes it a very simple matter for a station to receive information or data from a plurality of other stations in a transmission cycle. To this end, the station need only take the particular data individually from the returning data frame.

In another refinement, which even on its own is an inventive further development over known methods for transmitting data in a control system, the stations read the extraneous transmission data from the returning data frame (or from various returning data frames) and rearrange them to form a station-specific data word. Accordingly, every station contains a communication module of the type cited above with a data sorter which is designed to rearrange extraneous transmission data from the returning data frame to form a station-specific data word.

As an alternative to this, it would also be possible, by way of example, to compile the extraneous transmission data actually on the transmitter or upon transmission in a manner which is appropriate for the receiver(s). By contrast, the preferred refinement has a higher level of flexibility because every receiving station can compile the extraneous transmission data relevant to it on an individual basis such that the subsequent data processing in the receiving station can be carried out in optimum fashion. In particular, transmission data can be compiled a plurality of times in different ways in different, station-specific combinations. A particular preference in this context is if the receiver-specific data sorting takes place in the communication module, that is to say on a very low level of the OSI reference model, because higher applications on the receiving station can then process the rearranged data very rapidly and conveniently. This allows a wide range of interoperability. In addition, this refinement is particularly advantageous in combination with the use of consequent frames and/or the use of a multiplex mode of the type described above, because compilation of the transmission data over a plurality of returning data frames is significantly simplified.

In another refinement, the first station generates every outgoing data frame with a plurality of status fields, where every second station is assigned at least one status field, and where every second station changes its status field for every pass of the outgoing data frame.

Such status fields can be used to implement life monitoring very easily. The fact that every station changes its status field upon the passage means that the first station can check whether the originally present second stations are still present and active at the end of every cycle. The refinement is particularly advantageous when the new method is intended to be used to transmit safety-related process and control data, since failure of a safety-related station is a safety-critical state and an appropriate error message or error handling routine needs to be started.

It goes without saying that the features which have been mentioned above and which are yet to be explained below can be used not just in the respective indicated combination but also in other combinations or on their own without departing from the scope of the present invention.

BRIEF DESCRIPTION OF THE DRAWINGS

Exemplary embodiments of the invention are illustrated in the drawing and are explained in more detail in the description below. In the drawing:

FIG. 5 shows a plurality of Ethernet telegrams which are sent successively in one exemplary embodiment of the novel method, FIG. 6 shows a plurality of Ethernet telegrams which are sent successively in another exemplary embodiment of the novel method.

DESCRIPTION OF PREFERRED EMBODIMENTS

Figure 1:
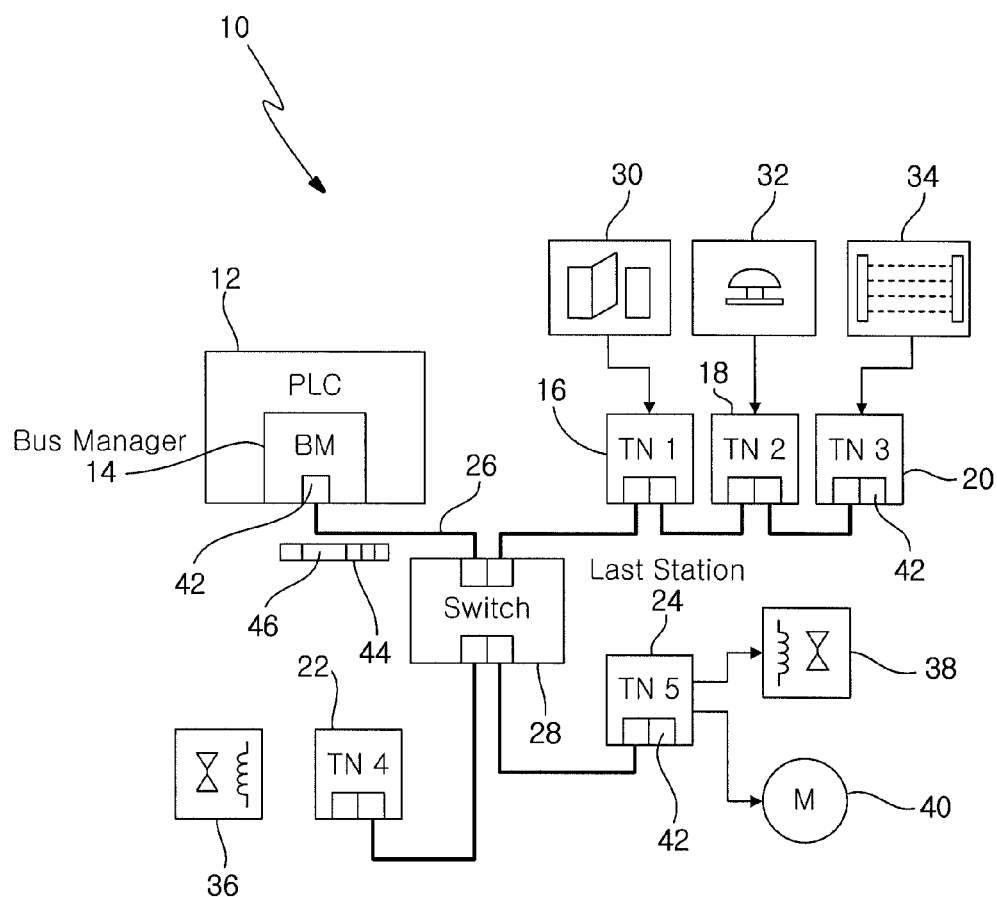
FIG. 1 shows an exemplary embodiment of the novel control system in a schematic illustration.

In FIG. 1, an exemplary embodiment of the novel control system is denoted in its entirety by reference numeral 10.

The control system 10 comprises a control unit 12, for example in the form of a programmable logic controller, which is referred to as PLC here. Alternatively, it can also be a different control unit, for example an industrial PC. The control unit 12 undertakes control of a technical installation (not shown in more detail here), such as a production or conveyor installation, at the application level. In this regard, it processes process or state data from the installation which are captured using sensors, and it generates control data which are used to operate actuators. To communicate with the sensors and actuators, the control unit 12 uses a communication network which implements an exemplary embodiment of the novel method in the manner described below.

To communicate with the local sensors and actuators, the control unit 12 in this case has what is known as a bus manager 14, which is a first station in the context of the present invention. In other exemplary embodiments of the invention, the bus manager may be implemented separately from the control unit 12. The control unit 12 could in this case contain a communication module which connected it to the communication network as a second station in terms of the present invention.

The control system 10 also comprises a plurality of stations 16, 18, 20, 22, 24, where the stations 16-22 are second stations in terms of the present invention, whereas the station 24 in this exemplary embodiment is a last station in terms of the invention. In the embodiment shown, the stations 16-24 each are I/O units which are designed to pick up input signals from sensors and output control signals to actuators.

The bus manager 14 (and hence the control unit 12) is connected to the stations 16 to 24 by means of a communication medium 26. In this case, the communication medium 26 contains a switch 28, which is shown as an example of one possible implementation here. Specifically, the bus manager 14 in this case is connected to a connection of the switch 28 by means of an Ethernet cable. A second connection of the switch 28 is connected to a first connection of the station 1 6 by means of a further Ethernet cable. A second connection of the station 1 6 is connected to a first connection of the station 1 8 by means of a further Ethernet cable. Finally, the station 18 is connected to the station 20 by means of a second connection and a further Ethernet cable. The bus manager 14, the switch 28 and the stations 16-20 are thus physically arranged in a series, with every station being connected to its neighbor in the series by means of point-to-point connection.

In this exemplary embodiment, the switch 28 is also connected to the station 22 by means of a third connection and a further Ethernet cable and to the station 24 by means of a fourth connection and a further Ethernet cable. The communication network in the control system 10 in this exemplary embodiment therefore has a hybrid form comprising a serial topology and a star topology. Logically, however, all the stations 16-24 and the bus manager 14 are arranged in a series as explained in even more detail below.

In this simplified exemplary embodiment, the station 16 has a protective door 30 connected to it. This involves a sensor which can be used to monitor the open or closed state of a protective door. Similarly, the station 18 has an emergency off switch 32 connected to it and the station 20 has a light grid 34 connected to it. The three aforementioned sensors 30, 32, 34 are typical examples of sensors for protecting an automatically operating installation. It goes without saying that the present invention is not limited to the use of such safety sensors, i.e. the stations 16-20 may equally also have sensors for standard control tasks connected to them.

In this case, the stations 22 and 24 have solenoid valves 36, 38 and a drive 40 connected to them by way of example. These are typical actuators which are used in an automatically controlled installation, although the present invention is not limited to these actuators.

In this exemplary embodiment, the connection between the individual stations and the bus manager and the switch is made by means of CAT5 Ethernet cable. Accordingly, the individual connections 42 of the stations, of the bus manager and of the switch are in the form of RJ45 connections 42. In other exemplary embodiments of the invention, it is also possible to use other lines, for example glass fiber cables, or else radio links (e.g. WLAN), however.

In line with the novel method, the bus manager 14 generates a bus telegram 44 at regular intervals of time, said bus telegram containing a data frame 46 having a plurality of data fields (not shown separately in this case). In the exemplary embodiment in FIG. 1, the bus telegram 44 is an Ethernet-compatible telegram with an Ethernet header at the start and a concluding checksum. The data area provided by the Ethernet telegram is the data frame 46.

The bus manager 14 sends the bus telegram 44 to the station 16 which comes after it in the logical series. In this case, it addresses the station 16 in the manner known from the Ethernet using its MAC address. The station 16 receives the bus telegram 44, fills a data field assigned to it with transmission data in a manner which is described below and sends the data frame 46 with a new Ethernet-compatible bus telegram (not shown here) to the next station 18. In this context, the station 16 in turn addresses the station 18 using its MAC address. In the same way, the station 18 transmits the data frame to the station 20. Next, the station 20 sends the data frame to the station 22. From there, the data frame is forwarded to the station 24, and then the data frame 46 runs in the opposite order through the stations 22 to 16 and finally to the bus master 14. In this context, the data frame 46 is forwarded from one station to the next using the respective MAC address of the destination station. The switch 28 is transparent, i.e. although it is physically present it routes the data frame 46 only from the respective transmitting station to the addressed receiver station without altering the data frame 46 in the process.

Figure 2:
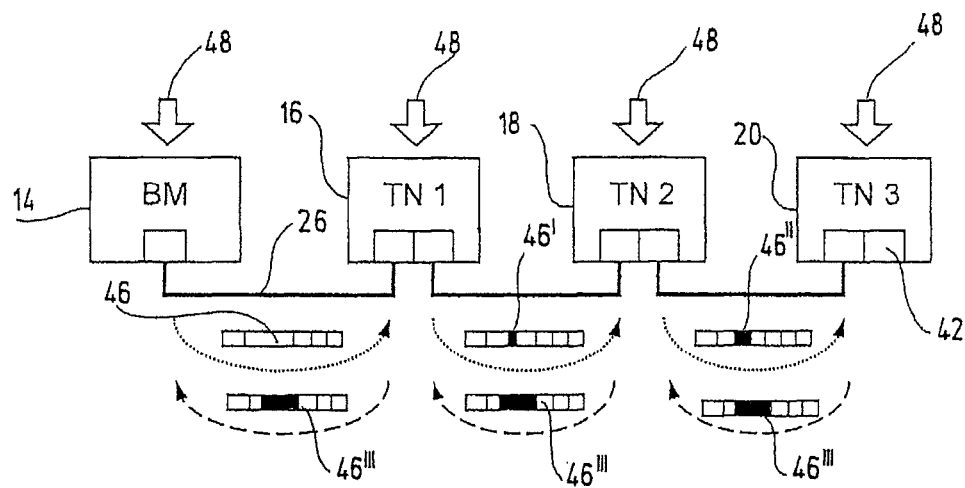
FIG. 2 shows a further exemplary embodiment of the novel control system in a schematic illustration.

FIG. 2 shows the forwarding of the data frame 46 from one station to the next and back in a simplified embodiment in which the physical topology of the communication network also corresponds to the logical series. In this case, the same reference symbols denote the same elements as previously.

The data frame 46 is first of all sent by the bus manager 14 to the station 16, the bus manager 14 addressing the station 16 using its MAC address. The station 16 fills a data field assigned to it within the data frame 46 with transmission data and sends a data frame 46' containing the new transmission data to the station 18. The station 18 puts its transmission data into a data field assigned to it and sends a data frame 46" containing the transmission data from the station 16 and the station 18 to the station 20. The station 20 fills a data field assigned to it with its transmission data and returns a data frame 46''' containing all the transmission data to the station 1 8. On the return path, the data frame 46''' passes through all the stations until it arrives at the bus manager 14. Every station, including the bus manager, can therefore read extraneous transmission data from the other stations provided that it is appropriately configured.

The assignment regarding which data fields the individual stations 16 to 20 are permitted to fill with their own transmission data and which data fields containing extraneous transmission data the stations 16 to 20 and the bus manager 14 are permitted to read is set individually in a configuration mode before the control mode is started, which is shown symbolically by block arrows 48.

Figure 3:
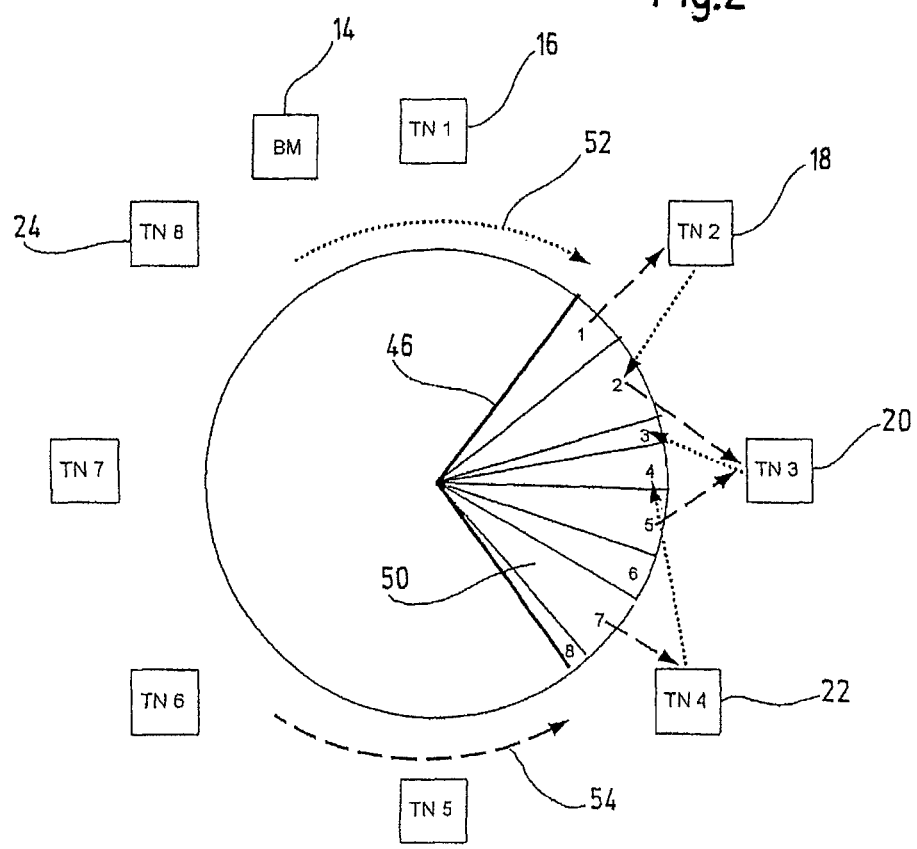
FIG. 3 shows a symbolic diagram to explain the novel method.

FIG. 3 shows the cyclic circulation of the data frame 46 and the filling and reading of individual data fields in a symbolic illustration. The data frame 46 is in this case shown as a circle segment with eight data fields 50 of different size. Each of the eight stations in this case has been assigned a data field 50 exclusively for filling with transmission data. By way of example, the station 18 fills the data field 2 with transmission data, the station 20 fills the data field 3, and the station 22 fills the data field 4. The data fields 50 are respectively filled with transmission data when the stations have received the data frame 46 from the previous station and before or while the stations forward the data frame 46 to the next station. The receiving and forwarding of the data frame 46 are shown symbolically by means of the arrow 52.

When the data frame 46 filled with all the transmission data is returned from the last station 24 in the opposite direction (arrow 54), the individual stations can read extraneous transmission data from the other data fields. By way of example, FIG. 3 shows that the station 1 8 reads transmission data from the data field 1, that is to say transmission data from the station 16. In this case, the station 20 reads transmission data from the data fields 2 and 5, and the station 22 reads them from the data field 7. When the data frame 46 has been sent once from the bus manager 14 to the last station 24 and back again, all the stations involved have had the opportunity to send their own transmission data and to read extraneous transmission data.

Figure 4:
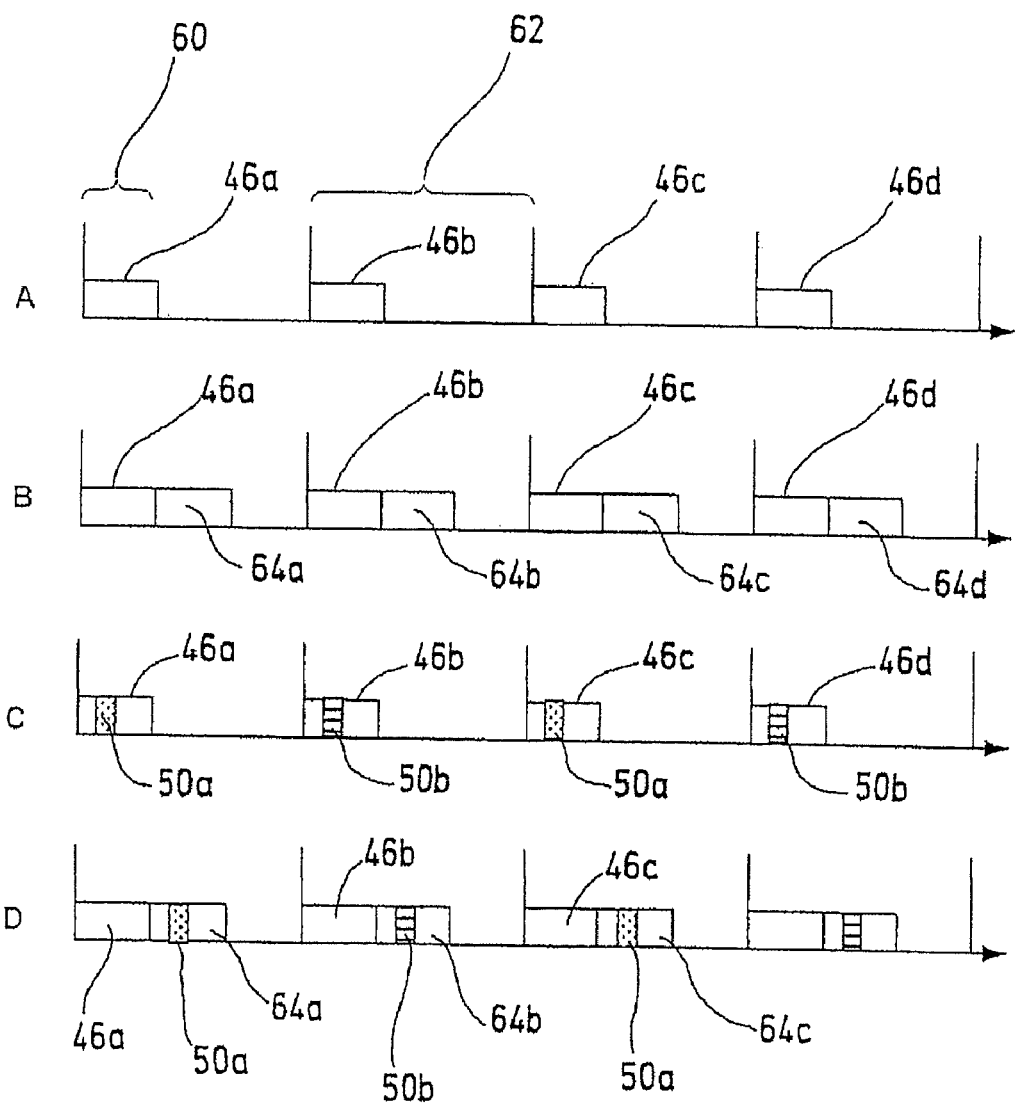
FIG. 4 shows timing diagrams which show various modes of operation of the novel control system or various exemplary embodiments of the novel method.

FIG. 4 shows the timing for sending the data frames 46 in various exemplary embodiments of the invention. The reference numeral 60 shows the length of a data frame 46 (to be more precise, that of a bus telegram 44 which contains the data frame 46). The reference numeral 62 denotes the cycle time, i.e. the time between two successive but mutually independent data frames 46 being generated.

FIG. 4A shows a timing diagram in which precisely one data frame 46 is generated and sent in each cycle time 62. In the preferred exemplary embodiment of the invention, the data frame 46 must return to the bus manager 14 within the cycle time 62, so that the bus manager 14 can send a repeat frame in the next cycle time 62 if appropriate. This preferred embodiment has the advantage that the links between the individual stations are always carrying just one bus telegram 44, which avoids collisions typical of Ethernet. Alternatively, however, it is basically possible to send a second data frame 46b even before the first data frame 46a arrives at the bus manager 14 again.

FIG. 4B shows an exemplary embodiment in which the bus manager 14 generates and sends two directly successive data frames 46, 64 in each cycle time 62. The respective second data frame 64 is designated as a consequent frame, which is sent with a separate bus telegram. Logically, the two data frames 46, 64 belong together, however, i.e. the split into two separate frames 46, 64 is in this case made only in order to observe the telegram width of the Ethernet specification, even if the number of data words provided in the Ethernet telegram (typically 1500 bytes) is not sufficient to provide the necessary data fields for all connected stations.

FIG. 4C shows an exemplary embodiment in which individual data fields 50 are used in multiplex mode. In a first transmission cycle, the data field 50a is filled with transmission data by the station 18, for example. In the next transmission cycle, the same data field (now denoted as 50b) is filled with transmission data by the station 20 instead. In the third transmission cycle, the station 18 again fills the data field 50a etc. At the same time, the other data fields in the data frame 46 may be assigned to other stations alone. As already mentioned, the multiplex mode can be used to allow individual stations to have transmission cycles at shorter successive times than other stations.

FIG. 4D shows an exemplary embodiment which makes use of both the consequent frame shown in 4B and of the multiplex mode shown in 4C. Preferably, the data fields in the multiplex mode are transmitted only in the consequent frames 64 in this case.

FIG. 5 shows an exemplary embodiment of the novel method in which various Ethernet bus telegrams 44a, 44b and 44c are transmitted using the communication medium 26. Each Ethernet bus telegram has an Ethernet header 70 and a checksum 72, as is known. The Ethernet header 70 contains, inter alia, the MAC addresses of the transmitter and the receiver, as specified for Ethernet-compatible communication media. The Ethernet telegram's data area accommodates the data fields 50 which are individually associated with the individual stations. The data fields 50 are not shown separately in FIG. 5 but are denoted by the term "cyclic", since the individually assigned data fields are preferably used for the cyclic transmission of data in every n-th bus telegram, where n=1, 2, 3 . . . In addition, the bus telegram 44 in this case contains an acyclic data area 74 in its data area. Upon request, the individual stations can fill the acyclic data area with transmission data. If the acyclic data area 74 has been filled with transmission data by a station, this is signaled by means of an occupation flag (not shown here), which may be provided at the start of the acyclic area, for example. A station which wants to send data in the acyclic data area 74 can therefore do this only if the acyclic data area 74 has not already been filled by a previous station. This can easily be identified from the occupation flag (not shown).

In a particularly preferred embodiment, two such Ethernet bus telegrams 44a, 44c can have further Ethernet bus telegrams 44b transmitted between them, the further telegrams 44b observing a protocol structure based on TCP/IP, for example. In this way, other data can also be transmitted besides the control data for the control system 10. By way of example, a PC connected to the communication medium 26 can thus transmit printer data to a printer which is likewise connected to the communication medium, these data being able to be completely independent of the control data.

FIG. 6 shows another exemplary embodiment for how control data and other data can be transmitted together via the communication medium 26. Unlike the embodiment shown in FIG. 5, the TCP/IP-compatible data are in this case transmitted in the acyclic data area 74 of each bus telegram 44a, 44b, 44c. This alternative is particularly preferred if the system's cycle time does not permit separate transmission of conventional Ethernet telegrams or permits it only at an increased risk of collision. In the preferred embodiments of the invention, however, the data fields 50 for the cyclic transmission of control data are always reserved for the respective stations to which the data fields 50 are individually assigned.

In line with another exemplary embodiment, the bus telegrams 44 in the illustrations shown in FIGS. 5 and 6 also contain a further data area 76 which is used to transmit telegram data which are compatible with a conventional field bus telegram. In one particularly preferred embodiment, the data area 76 is used to transmit transmission data which is based on the specifications of what is known as the Safety BUS p. This is a specific bus system based on the CAN bus (CAN-compatible) in which an additional protocol level allows safety-related control data to be transmitted. In a particularly preferred embodiment, the data fields 50 are used to transmit control data for standard control tasks, the data area 74 is used to transmit Safety BUS p-compatible safety-related control data, such as the state information from the safety sensors 30, 32, 34 and stop commands for the actuators 36 to 40, and the data area 74 is used to transmit diagnostic data which the individual stations respectively send only upon individual request.

Figure 7:
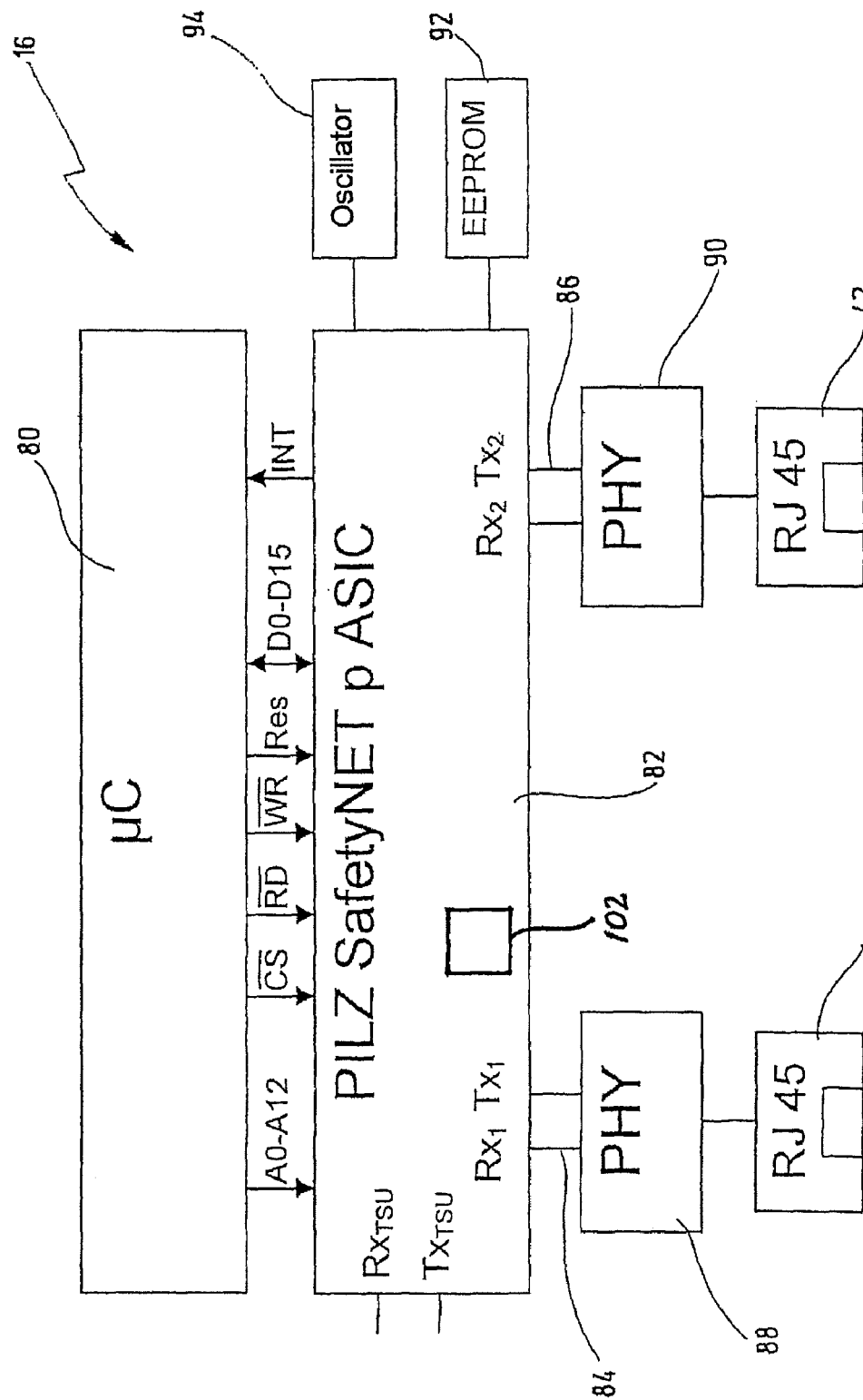
FIG. 7 shows a schematic illustration of a station from the novel control system.

FIG. 7 is a simplified block diagram to show the structural design of an individual station, such as the station 16. Reference numeral 80 denotes a microcontroller which represents the application level of the station 16. The microcontroller implements the function of the station 1 6 within the control system 10, that is to say in this case the function of the I/O unit. Instead of a microcontroller, it is also possible to use another component which performs an application-specific task, for example a PC or an application-specific IC (ASIC).

The application 80 communicates with a communication module 82 which is designed to implement the communication protocol on the basis of the inventive method. In the preferred embodiment, in which the communication medium 26 is an Ethernet-compatible transmission link, the communication module 82 is connected to a respective protocol block 88, 90 by means of two connections 84, 86. The protocol blocks 88, 90 are routed to the RJ45 connections 42 and generate the Ethernet-compatible bus telegrams 44 in which the data frames 46 based on the present invention are embedded. The data frames 46 and the data areas 74, 76 (if used) are generated by the communication module 82. In addition, each station 16 contains a memory 92 which stores, inter alia, the configuration data which are used to assign to each station data fields 50 for writing and reading its own or extraneous transmission data. An oscillator 94 generates a reference clock.

In the exemplary embodiment shown in FIG. 7, the communication module 82 is in the form of an ASIC, which is particularly preferred for short cycle times of 62.5 μs or 125 μs, for example. Alternatively, the communication module 82 may also be in the form of a software block which is executed on a suitable hardware platform. The latter is particularly preferred for longer cycle times of 1 ms or 5 ms, for example.

Figure 8:
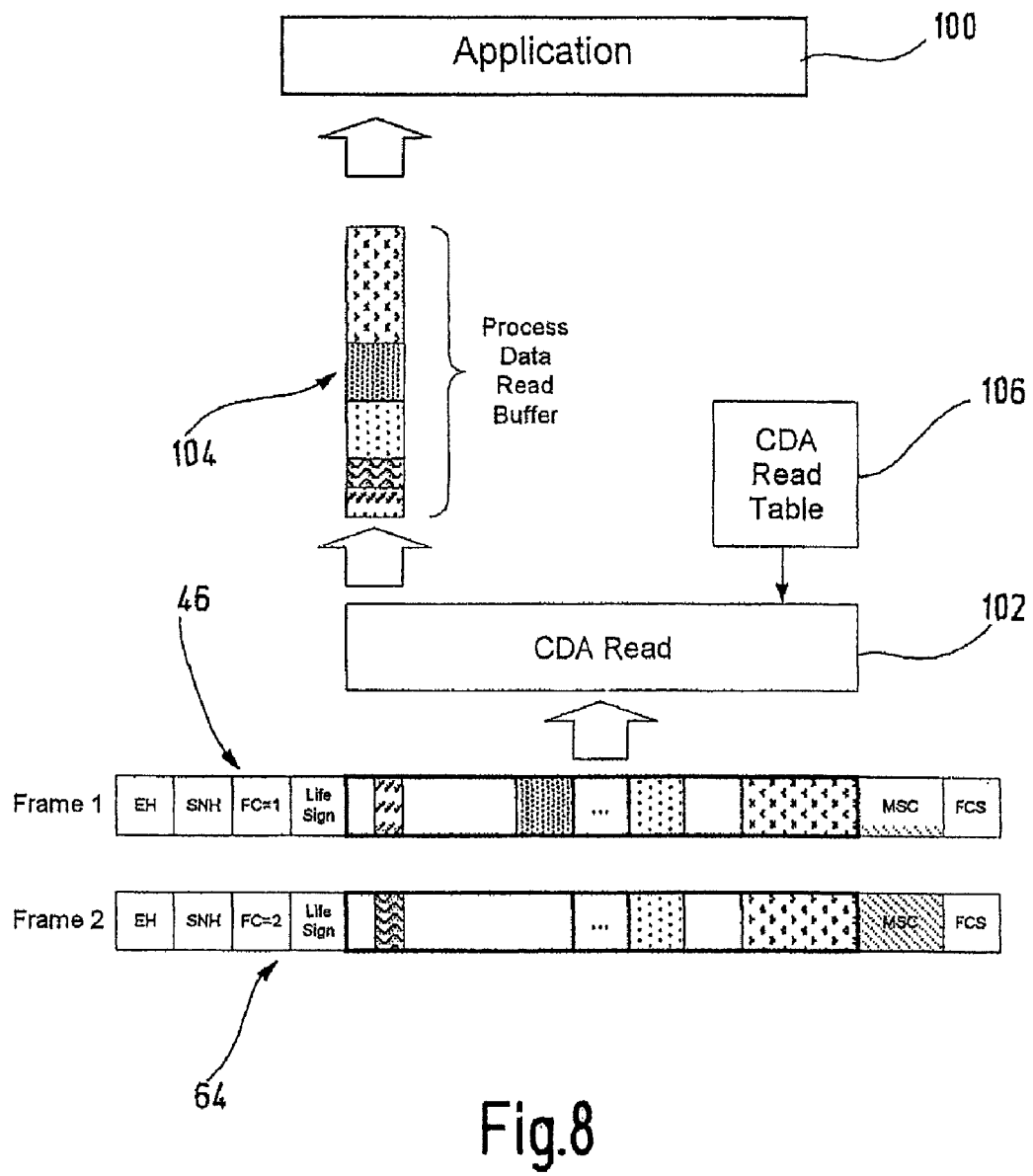
FIG. 8 shows a schematic illustration of a preferred exemplary embodiment in which the data are rearranged when read from the returning data frames.

FIG. 8 shows a schematic illustration of a preferred embodiment in which the transmission data from two successive, returning data frames 46, 64 are rearranged or recompiled upon reading such that they are in a form which can be processed in optimum fashion for the application 100. The transmission data read are compiled in a data sorter 102 to form a new data word or data frame 104 which the application 100 accesses. For this, the data sorter uses a sorting table 106 which is assigned to it by the bus manager 14 when the system is initialized. As shown by the various patterns, the data sorter 102 can read individual transmission data from successive returning data frames 46, 64 and can compile them in a new data word 104, which allows particularly advantageous operation with consequent frames. In addition, the data sorter 102 can also associate the data fields filled alternately in multiplex mode correctly in each case. For this, it uses a data frame counter (FC) and a cycle counter (not shown here). The former counts or identifies the successive consequent frames within a transmission cycle, and the latter distinguishes data frames from different transmission cycles.

The preferred embodiments of the invention have been explained with reference to an Ethernet-compatible communication medium. This is particularly preferred because Ethernet is a widely used communication platform and the required hardware and software components are therefore commercially available at low costs. As an alternative to this, the present invention may, in principle, also be implemented on other communication media, however.

What is claimed is:

1. A method for transmitting data in a control system comprising a plurality of spatially distributed stations which are connected to one another via a communication medium, the stations comprising at least one control unit for processing state data captured by sensors and for generating control data for operating actuators and comprising a plurality of I/O units connected to said sensors and actuators, the stations being logically arranged in a series which defines a first station, at least one second station and a last station, the method of performing peer-to-peer communication between all stations in said series of stations within a single communication cycle defined from the start of an outgoing data frame from the first station and the receipt by the first station of a returning data frame, comprising the following steps:

the first station generates a data frame having a plurality of data fields, with every second station and the last station being clearly assigned at least one data field for filling with transmission data, said transmission data comprising said state data and said control data, the first station sends the data frame as said outgoing data frame to that second station which comes after the first station in the series, the second stations receive the outgoing data frame from the respective previous station in the series, fill a data field assigned to it with transmission data and send the outgoing data frame with the transmission data to the next station in the series, and the last station receives the outgoing data frame from the previous station in the series, fills a data field assigned to it with last transmission data and returns the data frame with all the accumulated transmission data as said returning data frame to the series of stations, wherein the stations read said transmission data from other stations from the data fields in the returning data frame.

2. The method of claim 1, wherein the first station generates the outgoing data frame cyclically at predetermined intervals of time and sends it to the next second station.

3. The method of claim 1, wherein the data frame contains at least a first and a second group of data fields, where the data fields in the first group are permanently assigned to the individual stations over all the data frames and where the data fields in the second group are assigned to the stations upon individual request for a respective data frame.

4. The method of claim 1, wherein the returning data frame passes through the series of stations in an opposite order than the outgoing data frame.

5. The method of claim 1, wherein the first station monitors whether the returning data frame arrives within a predefined time period.

6. The method of claim 1, wherein the communication medium is an Ethernet-compatible transmission link, and the data frame is an Ethernet-compatible data frame.

7. The method of claim 1, wherein at least every second station sends the outgoing data frame to the next station in the series using the cut-through method.

8. The method of claim 1, wherein every station sends the outgoing data frame to precisely one next station.

9. The method of claim 1, wherein the first station generates a plurality of data frames and sends them to the next second station in direct succession as outgoing data frames.

10. The method of claim 1, wherein individual data fields are filled with transmission data alternately by at least two stations.

11. The method of claim 1, wherein individual stations fill at least one data field in the data frame with transmission data which are compatible with a field bus telegram.

12. The method of claim 1, wherein the stations are individually assigned the data fields in the outgoing data frame for filling with said state data and the data fields in the returning data frame for reading said transmission data.

13. The method of claim 1, wherein the stations read said transmission data from the returning data frame and rearrange them to form a station-specific data word.

14. The method of claim 1, wherein the first station generates every outgoing data frame with a plurality of status fields, wherein every second station is assigned at least one status field, and wherein every second station changes its status field when the outgoing data frame passes through.

15. A control system for the automated control of installations or appliances, comprising a plurality of spatially distributed stations connected to one another via a communication medium, said stations comprising at least one control unit for processing state data captured by sensors and for generating control data for operating actuators and comprising a plurality of I/O units connected to said sensors and actuators, where the stations are logically arranged in a series which defines a first station, at least one second station and a last station, the control system being configured to perform peer-to-peer communication between all stations in said series of stations within a single communication cycle defined from the start of an outgoing data frame from the first station and the receipt by the first station of a returning data frame, wherein the first station is designed to generate a data frame having a plurality of data fields, with every second station and the last station being clearly assigned at least one data field for filling with transmission data, said transmission data comprising said state data and said control data, wherein the first station is further designed to send the data frame as said outgoing data frame to that second station which comes after the first station in the series, wherein every second station is designed to receive the outgoing data frame from the respective previous station in the series, to fill a data field assigned to it with transmission data, and to send the outgoing data frame with the transmission data to the next station in the series, and wherein the last station is designed to receive the outgoing data frame from the previous station in the series, to fill a data field assigned to it with last transmission data, and to return the data frame with all the accumulated transmission data as said returning data frame to the series of stations, wherein the stations are designed to read said transmission data from other stations from the data fields of the returning data frame.

16. The control system of claim 15, wherein said at least one control unit is designed to cyclically process said state data and to generate said control data on the basis thereof, and wherein said I/O units are designed to send said state data to the control unit and to receive said control data from the control unit.

17. The control system of claim 15, wherein each station comprises a communication module having a data sorter designed to rearrange said transmission data read in order to form a station-specific data word.

18. A communication module comprising an application-specific integrated circuit or a programmable hardware platform for use in a station of a control system comprising a plurality of spatially distributed stations connected to one another via a communication medium, the stations comprising at least one control unit for processing state data captured by sensors and for generating control data for operating actuators and comprising a plurality of I/O units connected to said sensors and actuators, where the stations are logically arranged in a series which defines a first station, at least one second station and a last station, the control system being configured to perform peer-to-peer communication between all stations in said series of stations within a single communication cycle defined from the start of an outgoing data frame from the first station and the receipt by the first station of a returning data frame, with the first station being designed to generate a data frame having a plurality of data fields, with every second station and the last station being clearly assigned at least one data field for filling with transmission data, said transmission data comprising said state data and said control data, with the first station being further designed to send the data frame as said outgoing data frame to that second station which comes after the first station in the series, with every second station being designed to receive the outgoing data frame from the respective previous station in the series, to fill a data field assigned to it with transmission data, and to send the outgoing data frame with the transmission data to the next station in the series, and with the last station being designed to receive the outgoing data frame from the previous station in the series, to fill a data field assigned to it with last transmission data, and to return the data frame with all the accumulated transmission data as said returning data frame to the series of stations, wherein the communication module is designed to receive the outgoing data frame and to fill it with the transmission data, to read the transmission data from the returning data frame, and to forward the outgoing data frame and the returning data frame to two different recipients.

19. A communication module comprising an application-specific integrated circuit or a programmable hardware platform for use in a station of a control system comprising a plurality of spatially distributed stations connected to one another via a communication medium, the stations comprising at least one control unit for processing state data captured by sensors and for generating control data for operating actuators and comprising a plurality of I/O units connected to said sensors and actuators, where the stations are logically arranged in a series which defines a first station, at least one second station and a last station, the control system being configured to perform peer-to-peer communication between all stations in said series of stations within a single communication cycle defined from the start of an outgoing data frame from the first station and the receipt by the first station of a returning data frame, with the first station being designed to generate a data frame having a plurality of data fields, with every second station and the last station being clearly assigned at least one data field for filling with transmission data, said transmission data comprising said state data and said control data, with the first station being further designed to send the data frame as said outgoing data frame to that second station which comes after the first station in the series, with every second station being designed to receive the outgoing data frame from the respective previous station in the series, to fill a data field assigned to it with transmission data, and to send the outgoing data frame with the transmission data to the next station in the series, and with the last station being designed to receive the outgoing data frame from the previous station in the series, to fill a data field assigned to it with last transmission data, and to return the data frame with all the accumulated transmission data as said returning data frame to the series of stations, so that the first and each second station can read the transmission data from the returning data frame, wherein the communication module is designed to generate the outgoing data frame, to send it to the next station in the series, and to monitor the return of the returning data frame within a predefined time period.

20. A method for transmitting data in a control system comprising a plurality of spatially distributed stations which are connected to one another via a communication medium, the stations comprising at least one control unit for processing state data captured by sensors and for generating control data for operating actuators and comprising a plurality of I/O units connected to said sensors and actuators, the stations being logically arranged in a series which defines a first station, at least one second station and a last station, the method comprising the following steps:

the first station generates a data frame having a plurality of data fields, with every second station and the last station being clearly assigned at least one data field for filling with transmission data, said transmission data comprising said state data and said control data, the first station sends the data frame as an outgoing data frame to that second station which comes after the first station in the series, the second stations receive the outgoing data frame from the respective previous station in the series, fill a data field assigned to it with transmission data and send the outgoing data frame with the transmission data to the next station in the series, and the last station receives the outgoing data frame from the previous station in the series, fills a data field assigned to it with last transmission data and returns the data frame with all the transmission data as a returning data frame to the series of stations, wherein individual data fields in the data frame are alternately filled with transmission data from at least two different stations from one transmission cycle to the next.

21. A method for transmitting data in a control system comprising a plurality of spatially distributed stations which are connected to one another via a communication medium, the stations comprising at least one control unit for processing state data captured by sensors and for generating control data for operating actuators and comprising a plurality of I/O units connected to said sensors and actuators, the stations being logically arranged in a series which defines a first station, at least one second station and a last station, the method of performing peer-to-peer communication between all stations in said series of stations within a single communication cycle defined from the start of an outgoing data frame from the first station and the receipt by the first station of a returning data frame, comprising the following steps:

the first station generates a data frame having a plurality of data fields, with every second station and the last station being clearly assigned at least one data field for filling with transmission data, said transmission data comprising said state data and said control data, the first station sends the data frame as said outgoing data frame to that second station which comes after the first station in the series, the second stations receive the outgoing data frame from the respective previous station in the series, fill a data field assigned to it with transmission data and send the outgoing data frame with the transmission data to the next station in the series, and the last station receives the outgoing data frame from the previous station in the series, fills a data field assigned to it with last transmission data and returns the data frame with all the accumulated transmission data as said returning data frame to the series of stations, wherein the stations read said transmission data from other stations from the returning data frame and rearrange said transmission data read to form a station-specific data word.

* * * * *